May 22, 1934. A. M. FARMER 1,959,909
LUBRICANT NIPPLE
Filed July 25, 1929
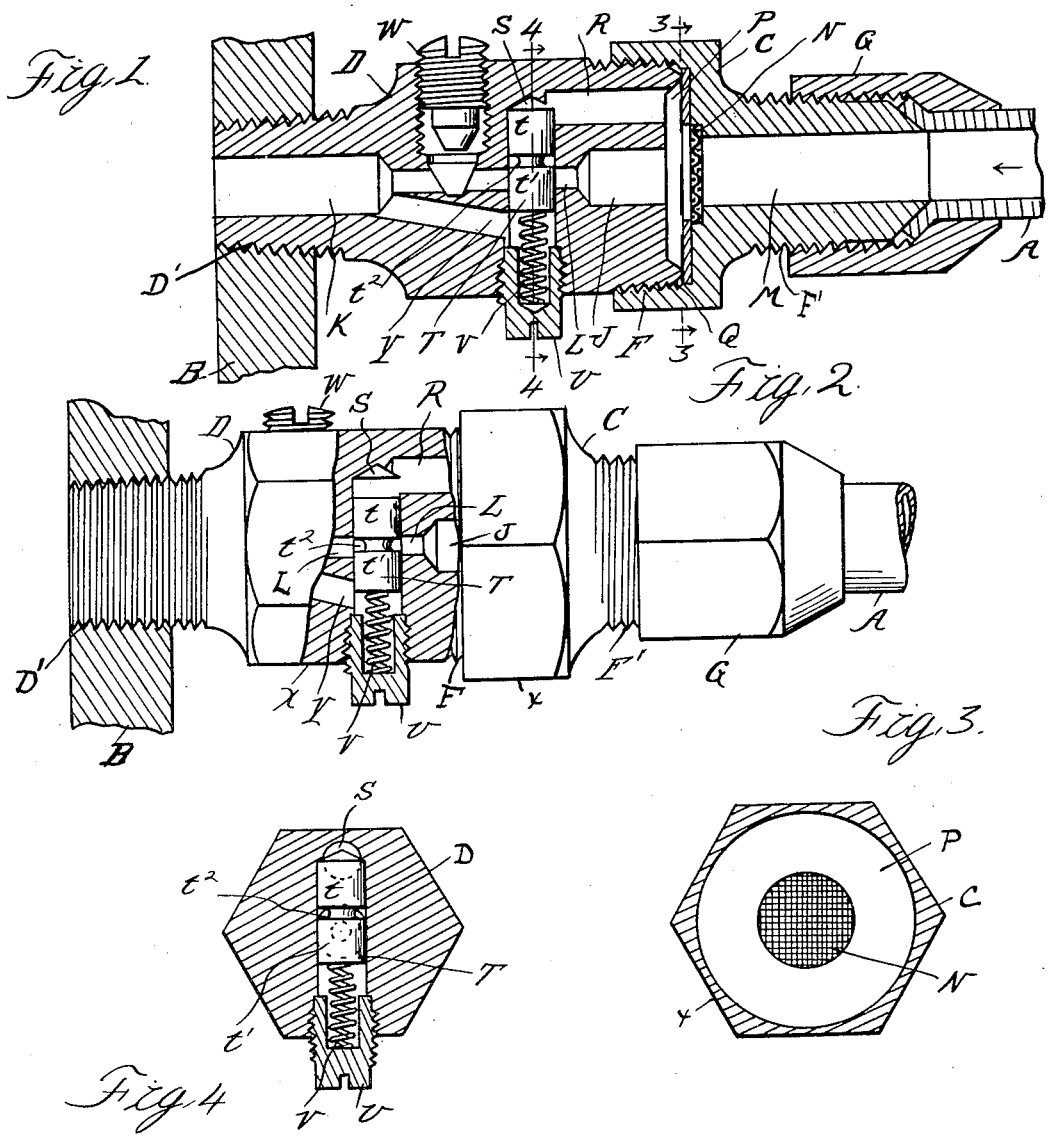
INVENTOR
Albert M. Farmer
BY
Swan and Fry
ATTORNEYS Patented May 22, 1934

1,959,909

UNITED STATES PATENT OFFICE 1,959,909

LUBRICANT NIPPLE

Albert M. Farmer, Detroit, Mich., assignor, by mesne assignments, of one-half to Edward N. Hartwick and one-half to Howard B. Bloomer, both of Detroit, Mich.

Application July 25, 1929, Serial No. 380,787

3 Claims. (Cl. 137—153)

This invention relates to an improved control nipple especially adapted for use in a force feed lubricant distributing system, and has for its object an improved organization of parts whereby the continuity of, or interference with, the feed of the lubricant may be automatically regulated, this automatic regulating mechanism being in turn susceptible to adjustment to provide for variant pressure and other conditions.

In the drawing:

Figure 1 is a sectional elevational view of my improved device.

Figure 2 is a similar elevational view, only the central portion being shown in section.

Figure 3 is a cross sectional view on the line 3—3 of Figure 1, and looking in the direction of the arrows there shown.

Figure 4 is a similar sectional view through the valve body, along the line 4—4 of Figure 1, and looking in the direction of the arrows there shown.

A represents the delivery end of a lubricant pipe line, a portion of which has been cut away for the insertion of the measuring nipple forming the subject of this invention, and through which pipe line the continuity or otherwise of the pressure upon the lubricant mass may be regulated by some such suitable external means as a valve or cock further back in the lubricant line. B represents the wall of a bearing chamber into which the lubricant is to be introduced, the threaded end D' of the nipple structure engaging therethrough. The latter nipple consists preferably of two independent sections C and D, each of which is preferably peripherally hexagonal in contour, as shown at $x$ in Figure 2, which are united by suitable threading F, and the terminal portion of the former of which is screw-threaded as at F' for the assembled engagement thereover of the threaded and internally flanged collar G, and into the body or shell B of the bearing to which the nipple is appurtenant, by means of which the pipe line A is secured to the nipple body. Generally speaking the nipple body thus constituted has a continuous longitudinal bore, the sections J and K of which are, however, preferably of greater cross-sectional size than the intermediate section L. Furthermore, that portion of the bore located within the piece C, as M, is preferably somewhat larger in diameter than the adjacent bore section J, and at its left hand end as viewed in Figure 1 it preferably has extending across it the screen N, for the exclusion from the operative parts of the nipple of such dirt particles as the entering lubricant stream may contain. That portion of the shell piece D immediately adjacent the shell piece C as assembled is provided with a shallow depression or chamber P, which is surrounded peripherally by the protruding wall edge Q, and from the central portion of this chamber the bore J continues in the manner already described, practically concentric with respect to the nipple body as a whole. At a point suitably removed from the bore J, though extending parallel therewith through the body of the shell D, extends a by-pass channel R, which leads into the blind end of the transverse valve chamber S, within which the valve body T engages intersectioningly of the small bore L. This valve body S is yieldingly upheld by the resilient action of the spring V, one end of which is seated in a recess in the anchorage and adjustment screw U, so that its lower section, as $t'$, blanks the bore L, which latter may be similarly blanked in case the valve body T is moved downwardly against the pressure of the spring V, until its section $t$ similarly blanks the bore L. If, however, the position of the valve body T within its bore S is such that its intermediate or annularly grooved portion $t^2$ is in registry with the bore L, a limited and regulated quantity of the lubricant may continue its travel through the bore L, subject to permanent though adjustable further restrictive regulation through the manually effected turning of the control screw W, so that its pointed tip, engaging into the bore L to the degree desired, regulates the net effective cross-sectional area thereof.

Also leading from the bore S, preferably from a point therein below the normal position of the valve body T, is a vent or clearance passage Y leading from the bore S to connection with the larger diametered longitudinal bore portion K; through the medium of this, surplus lubricant matter which has made its way past the valve body T in the bore S may find egress into the lubricant stream passing on through the bore K.

The operation of my improved device is as follows: In case the valve body T is in the position of entire blanking of the bore L, which is illustrated in Figure 1, the only escape of the lubricant passing from the bore M into the chamber P is in the first instance through the by-pass channel R, which, as already mentioned, leads into the upper end of the valve chamber S, and by pressure upon the top of the valve body T serves to depress the latter against the upward pressure of the spring V until the grooved central portion $t^2$ of the latter is in registry with the bore L, when a further outlet passage for the lubricant, until then trapped in the chamber P and the larger bore J, can escape and make its way on through the rest of the nipple. If this pressure is strong enough, notwithstanding the relief afforded through the opening clearance of the bore L, the pressure through the by-pass R continues at a sufficiently high point which may even effect the depression of the valve body T to a point where the upper, chamber-filling section $t$ thereof acts to blank the bore L in the same manner that the lower section $t'$ has done. If, however, the anchorage or adjustment screw U for the spring V has been properly set for the pressure contemplated, the balance between the resilient upward portions of the spring V and the pressure transmitted through the by-pass R is so nearly maintained on an equality, that the central grooved portion $t^2$ of the valve body is kept in more or less substantial registry therewith, thus permitting egress of the lubricant from the chamber P on through the further described sections of the bore more or less uninterruptedly. However, when the pressure upon the lubricant mass in the pipe line is terminated through intentional closing of a controlling member further back in the line, the resilient strength of the spring V becomes superior to the fluid pressure remaining in the by-pass R and in the top of the chamber S, and the valve body T rises once more to the point where its lower section $t'$ effectively blanks the bore L once more. Thus a proper adjustment of the spring V, taking into consideration the anticipated pressure upon the fluid, of which the by-pass R partakes, the balance between the parts may be so regulated as to continue the annular groove $t^2$ in registry with the small groove L which it intersects, for an appreciable portion of the time. This relatively balanced position of the valve body T, so that its groove $t^2$ is in registry with the bore L, is shown in the sectioned middle portion of Figure 2.

And since very few valve bodies can be made, and uniformly kept of an adequately tight seat within the walls of the chamber S so that no leakage of the lubricant past the valve T occurs, I have provided the vent passage Y shown as connecting the lower part of the space S with the large bore section K, thus providing a clearance vent for what oil may have made its way between the sides of the chamber S and the peripheral sides of the valve body T.

My improved device being especially adapted for use in a constant pressure lubricant supply system, the degree of flow through the bore which is desired at any particular time may be regulated by the position of the screw W relatively to the bore L into which its pointed tip projects. Since, however, it is also adapted for use in a hand pressure device, wherein exact constancy of pressure behind the lubricant mass is almost impossible, the substantial constancy of the lubricant ejection may then be effected by a proper proportioning between the regulated cross-sectional size of the bore L by means of the screw W and the strength of the spring V which yieldingly opposes the downward movement of the valve body T.

What I claim is:

1. In a controlling nipple for a fluid line, a longitudinally bored shell having an inlet and an outlet and a transversely positioned chamber therein, a laterally reciprocable valve body in said chamber movable to halt the passage of fluid therethrough when sufficiently actuated in either direction, spring means urging the valve toward one end of the passage and one closed position, a channel connecting said end of the transverse chamber and the inlet end of the shell, whereby the inlet pressure opposes said spring means and urges the valve toward the opposite closed position, and a relief channel connecting the other end of said chamber and the outlet end of the shell.

2. In a regulating nipple for a lubricant line, a longitudinally apertured body member, a valve chamber laterally intersecting said longitudinal aperture, a valve reciprocable therein and contoured to vary the effective size of passage through the longitudinal aperture concurrently with changes of position of the valve in its chamber, and to completely blank the longitudinal aperture when moved to the limit of its travel in either direction, a by-pass above the line of lubricant flow with respect to the valve chamber, and terminating in said valve chamber on one side of the valve, and a relief passage leading from the other side of the valve to the longitudinal aperture, farther down the line of lubricant flow than the valve chamber.

3. In a regulating nipple for a lubricant line, in combination with a flow of lubricant thereto under pressure, a longitudinally bored body member, a valve chamber laterally intersecting said longitudinal bore, a piston valve reciprocable therein and having its mid portion cut away to allow passage of lubricant through the longitudinal bore when in alignment therewith, and permitting stoppage of the flow through the longitudinal bore when the cut away portion is moved away from registration therewith in either direction, a spring behind the piston and urging it toward closed position in one direction, a pressure-transmitting passage connecting the inlet of the nipple with said chamber on the other side of the piston, whereby the pressure of supplied fluid urges said valve toward closed position in the opposite direction, and a relief passage connecting the spring end of the valve chamber behind the piston valve with the longitudinal bore farther down the line of normal lubricant flow than the valve chamber.

ALBERT M. FARMER.